(12) United States Patent
Sepe, Jr.

(10) Patent No.: US 7,744,285 B2
(45) Date of Patent: Jun. 29, 2010

(54) M28876/NGCON/D38999 TO MTP ADAPTOR AND A KIT CONTAINING THE SAME

(75) Inventor: Raymond B. Sepe, Jr., Medfield, MA (US)

(73) Assignee: Electro Standards Laboratories, Cranston, RI (US)

( * ) Notice: Subject to any disclaimer, the term of this patent is extended or adjusted under 35 U.S.C. 154(b) by 163 days.

(21) Appl. No.: 12/027,705

(22) Filed: Feb. 7, 2008

(65) Prior Publication Data

US 2009/0034912 A1 Feb. 5, 2009

Related U.S. Application Data

(60) Provisional application No. 60/889,176, filed on Feb. 9, 2007.

(51) Int. Cl.
*G02B 6/36* (2006.01)
*G02B 6/38* (2006.01)

(52) U.S. Cl. .............................. 385/53; 385/59; 385/71
(58) Field of Classification Search ....................... None
See application file for complete search history.

(56) References Cited

U.S. PATENT DOCUMENTS

2005/0196100 A1* 9/2005 Chen ........................... 385/33

* cited by examiner

*Primary Examiner*—Tina M Wong
(74) *Attorney, Agent, or Firm*—IP Authority, LLC; Ramraj Soundararajan

(57) ABSTRACT

An M28876/NGCON/D38999 to MTP adaptor is disclosed as a low cost substitute for high density fiber systems. The MTP adaptor has a mechanical footprint that is substantially similar to a standard M28876/NGCON/D38999 connector. A kit is also provided that comprises an MTP cable, a pair of ST to MTP fan out cables, and a plurality of M28876/NGCON/D38999 to MTP adaptors.

7 Claims, 8 Drawing Sheets

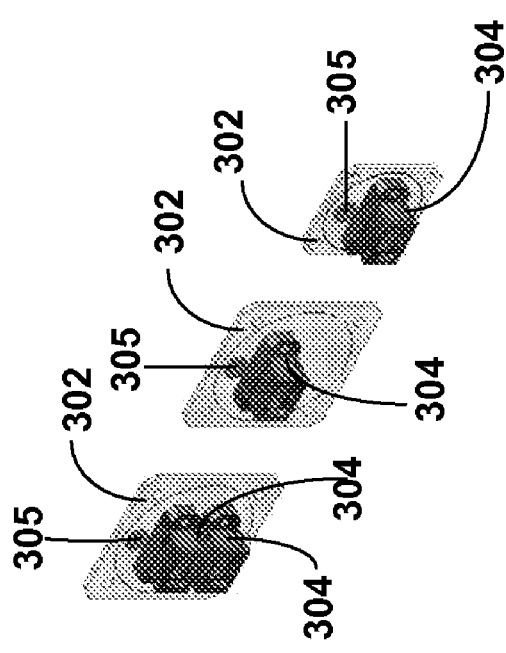
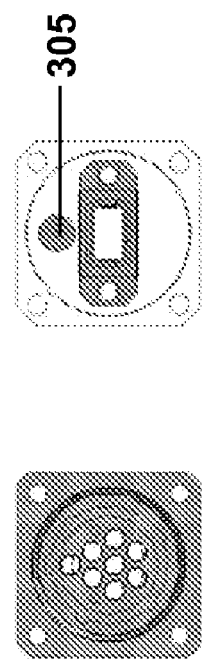
FIG. 3
FIG. 4

M28876/NGCON/D38999 TO MTP ADAPTOR AND A KIT CONTAINING THE SAME

RELATED APPLICATIONS

This application claims priority from U.S. Provisional Application 60/889,176 filed Feb. 9, 2007.

BACKGROUND OF THE INVENTION

1. Field of Invention

The present invention relates generally to the field of connectors. More specifically, the present invention is related to an M28876/NGCON/D38999 to MTP adaptor and a kit containing the same.

2. Discussion of Prior Art

As the need for more sophisticated electronic systems increases, the number of electrical signals needed for communications and operations is increasing dramatically, as is the required bandwidth of the signals. In defense applications, electromagnetic systems of high power are also now being employed and this puts an additional requirement of low susceptibility to electromagnetic interference. For reasons such as these, the defense industry is turning toward the use of optically encoded signals passed over fiber optic cables to meet these needs. However, the demanding defense environment including large vibrations, shock, and extreme temperatures means that special fiber optic connectors are needed. At present, the M28876 and D38999 families of fiber optic connectors and cable assemblies are being used, and the now under development NGCON family of fiber optic connectors and cable assemblies are slated for future use. The number of fibers in a single fiber optic cable and handled by a single connector can range from about 2 to 36 fibers. Due to the number of fibers in the connector and the rigorous construction specifications, these fiber optic connector systems are very costly and often have long delivery lead times.

In a typical development cycle for a military system, bench prototype units are built, followed by several phases of development and testing, often at secured locations such as military bases. During these prototype development and testing phases, extreme environmental conditions are often not required, or may be required during later phases of the testing. However, the mechanical and packaging design of the operational system has been completed and is designed for the military fiber connectors and assemblies. Changing of the documentation and packaging to use commercial style connectors to reduce cost or speed up delivery time is often not possible because of resource limitations in configuration management and documentation, as well as the additional costs associated with the changes. Therefore, prototyping and testing becomes very costly and in some cases it is so high that important tests in the development process may actually have to be omitted to conserve funds.

Whatever the precise merits, features, and advantages of the above cited references, none of them achieves or fulfills the purposes of the present invention.

SUMMARY OF THE INVENTION

In one embodiment, the present invention provides for an M28876/NGCON/D38999 to MTP adaptor comprising a M28876/NGCON/D38999 to MTP adaptor plate that comprises: an opening to receive an MTP fiber ribbon connector, with the MTP fiber connector connected to an MTP to ST fiber fan out cable, and an MTP connector being aligned with the opening, wherein the MTP connector is configured to connect an MTP cable with the MTP fiber ribbon connector, and wherein the M28876/NGCON/D38999 to MTP adaptor plate has footprint that is substantially similar to a standard M28876/NGCON/D38999 connector.

In another embodiment, the present invention provides for an M28876/NGCON/D38999 to MTP adaptor comprising either:

(a) an M28876/NGCON/D38999 to MTP adaptor plate; a rear panel component having a first opening to pass an MTP fiber ribbon connector, with the MTP fiber connector being connected to an MTP to ST fiber fan out cable; and a front panel component having an MTP connector, the MTP connector configured to connect an MTP cable with the MTP fiber ribbon connector, with the M28876/NGCON/D38999 to MTP adaptor plate sandwiched between the rear panel component and the front panel component and having at least a second opening aligned with the first opening in the rear panel to allow passage of the MTP fiber ribbon connector; or (b) an M28876/NGCON/D38999 to MTP adaptor plate; a rear panel component having an MTP connector, with the MTP connector being configured to connect an MTP cable with an MTP fiber ribbon connector, and the MTP fiber connector being connected to an MTP to ST fiber fan out cable; and a front panel component having a first opening to receive the MTP connector, with the M28876/NGCON/D38999 to MTP adaptor plate sandwiched between the front panel component and the rear panel component and having at least a second opening aligned with the first opening in the front panel to allow passage of said MTP connector;

wherein the M28876/NGCON/D38999 to MTP adaptor plate in (a) or (b) has a footprint that is substantially similar to a standard M28876/NGCON/D38999 connector.

In another embodiment, the present invention provides for an M28876/NGCON/D38999 to MTP adaptor kit comprising a pair of ST to MTP fan out cables; a pair of M28876/NGCON/D38999 to MTP adaptors, and an MTP to MTP cable, wherein each M28876/NGCON/D38999 to MTP adaptor comprises any of the following:

(a) an M28876/NGCON/D38999 to MTP adaptor plate; a rear panel component having a first opening to pass an MTP fiber ribbon connector, with the MTP fiber connector being connected to an MTP to ST fiber fan out cable; and a front panel component having an MTP connector, with the MTP connector being configured to connect an MTP cable with the MTP fiber ribbon connector; and the M28876/NGCON/D38999 to MTP adaptor plate being sandwiched between the rear panel component and the front panel component and having at least a second opening aligned with the first opening in the rear panel to allow passage of the MTP fiber ribbon connector;

(b) an M28876/NGCON/D38999 to MTP adaptor plate; a rear panel component having an MTP connector, with the MTP connector being configured to connect an MTP cable with an MTP fiber ribbon connector, and the MTP fiber connector being connected to an MTP to ST fiber fan out cable; and a front panel component having a first opening to receive the MTP connector; and the M28876/NGCON/D38999 to MTP adaptor plate being sandwiched between the front panel component and the rear panel component and having at least a second opening aligned with the first opening in the front panel to allow passage of the MTP connector; or (c) an M28876/NGCON/D38999 to MTP adaptor plate comprising: an opening to receive an MTP fiber ribbon connector, with the MTP fiber connector connected to an MTP to ST fiber fan out cable, and an MTP connector aligned with the opening, with the MTP connector being configured to connect an MTP cable with the MTP fiber ribbon connector;

wherein each of the above-mentioned M28876/NGCON/ D38999 to MTP adaptor plates in (a), (b), and (c) has a footprint that is substantially similar to a standard M28876/ NGCON/D38999 connector.

BRIEF DESCRIPTION OF THE DRAWINGS

FIG. 3 illustrates a non-limiting example of the mechanical design of the adaptor for the M28876/NGCON family of fiber optic connectors.

FIG. 4 illustrates a non-limiting example of the front view of the 8-fiber M28876 connector and the MTP adaptor.

DESCRIPTION OF THE PREFERRED EMBODIMENTS

Figure 1:
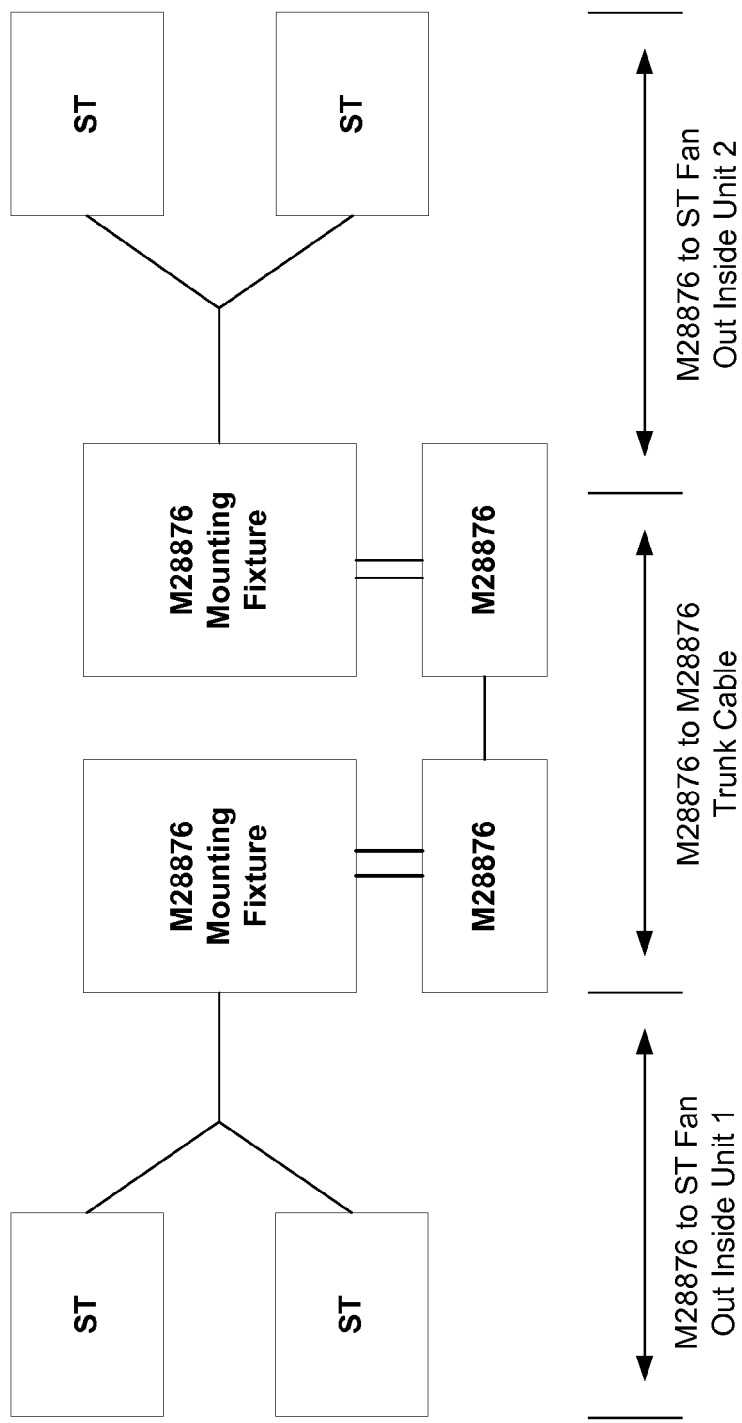
FIG. 1 shows the architecture of a typical fiber optic system that carries signals.

While this invention is illustrated and described in a preferred embodiment, the invention may be produced in many different configurations. There is depicted in the drawings, and will herein be described in detail, a preferred embodiment of the invention, with the understanding that the present disclosure is to be considered as an exemplification of the principles of the invention and the associated functional specifications for its construction and is not intended to limit the invention to the embodiment illustrated. Those skilled in the art will envision many other possible variations within the scope of the present invention.

It should be noted that throughout the description and the claims the terms MTP and MTO can be used interchangeably.

The present invention provides for a low cost commercial substitute for the high density fiber systems used in the defense industry. This new commercial substitute system fits the same physical footprint as the existing military fiber optic connectors so that there is minimal impact, if any, on the documentation and packaging of the system. Yet, commercially available high density fiber connector components are used thereby vastly reducing the cost while increasing the availability of the system. While not able to replace the military fiber optic cabling system in the most extreme environments, it is an attractive substitute during testing and development phases, and can be simply replaced by their military counterparts when environmental requirements dictate the need for it. In particular, the present invention provides for an adaptor that combines the physical dimensions and footprint of the military M28876/NGCON or D38999 fiber optic connector with the mounting of a standard high density MTP (or MPO) type of ribbon fiber connector. In this way, the same panel cutouts for the military connectors are now populated by the present invention's adaptor and the high density MTP ribbon fiber optic cables and assemblies are now used in place of the M28876/NGCON or D38999 connectors and assemblies. The typical cost savings is approximately 10 times less than that of the military counterpart, with much faster deliveries and reduced weight. Because the footprints are identical, there is virtually no change to the existing documentation and packaging design. Moreover, the commercial conversion system can achieve higher multi-fiber densities than their military counterparts. Although this innovation can use the footprint of any military fiber optic connector and combine it with any type of commercially available fiber optic connector, the preferred embodiment discussed here is the use of commercially available MTP (or MPO) style high density fiber ribbon cable connectors mounted on an adaptor that has the footprint of the M28876 military fiber optic connector. This is directly applicable to the NGCON military fiber optic connector since it has the same footprint as the M28876. Another version of the adapter uses the footprint of the D38999 military fiber optic connector. Without loss of generality, the discussion will proceed and call out the commercially available MTP family of fiber ribbon connectors with the footprint of the M28876 family of military fiber connectors. The MTP style of connector is used interchangeably with the MPO style of connectors, as well.

FIG. 1 shows the architecture of a typical fiber optic system that carries signals from unit 1 to unit 2. Inside unit 1 is a fiber optic fan out cable that individually terminates each fiber strand for interconnection to a suitable receptacle that carries the optical signal to the desired location. As shown in the figure, a typical termination is an ST style fiber optic connector but the fiber strands could be terminated by any suitable connector without changing the concept of the invention. On the other end of the fiber fan out is the M28876 connector that mounts directly to the panel of the unit. Unit 2 is configured in the same way as unit 1. Now, a multi-strand fiber optic cable that is terminated on both ends with an M28876 style connector carries the optical signals between unit 1 and unit 2.

Figure 2:
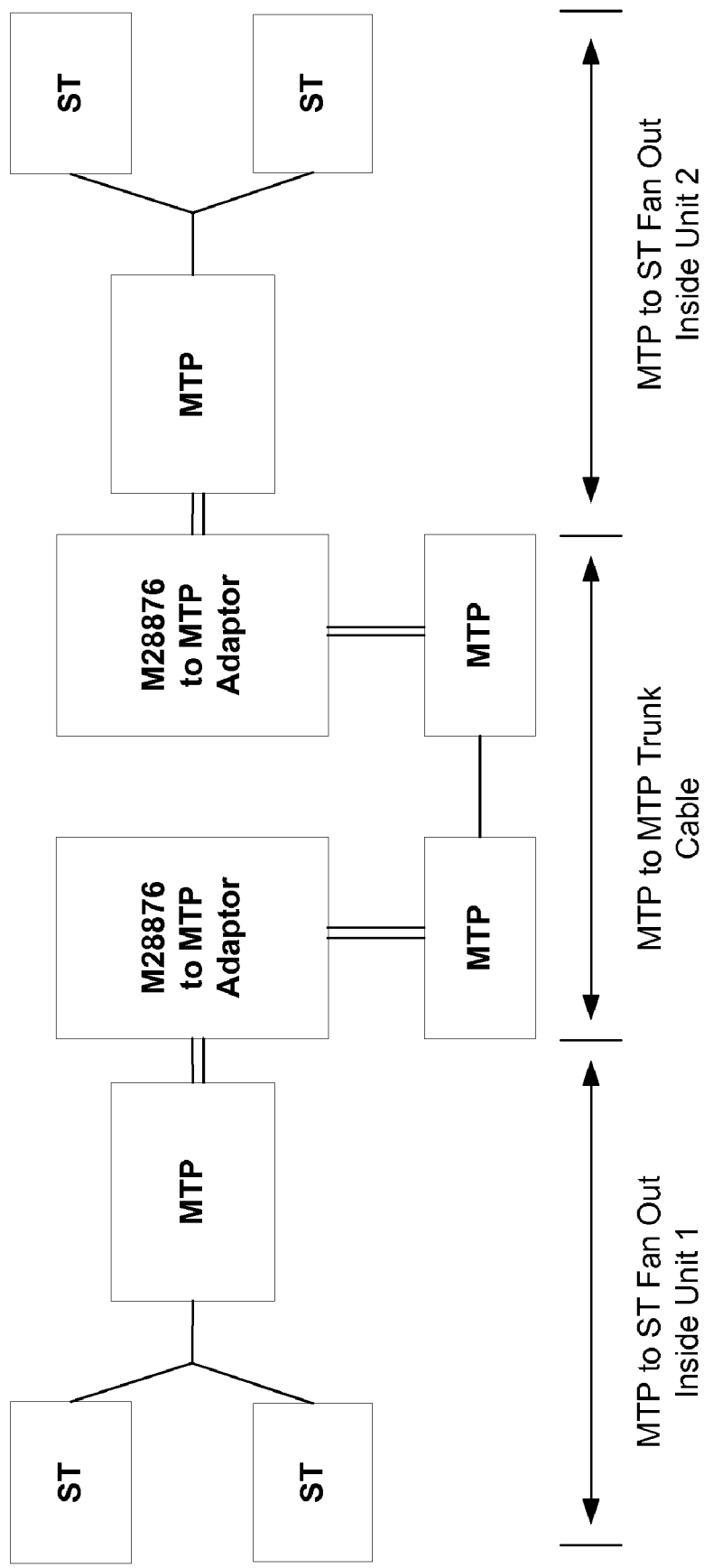
FIG. 2 shows the architecture of a non-limiting example of the present invention's MTP Commercial Conversion Kit.

FIG. 2 shows the MTP Commercial Conversion Kit. Unit 1 now contains an ST to MTP fiber fan out cable. As shown in the figure, a typical termination is an ST style fiber optic connector but the fiber strands could be terminated by any suitable connector without changing the concept of the invention. And in fact, this end can be terminated with the same type of fiber connector as the military assembly that it is replacing. On the other end of the fiber fan out is the MTP fiber ribbon connector. This plugs into the M28876-to-MTP adaptor plate that is mounted on the panel of unit 1. It has the same footprint as the military connector that it is replacing but contains an MTP style fiber optic assembly. Unit 2 has the same fan out cable and panel adapter as unit 1. Now, a multi-strand fiber optic cable that is terminated on both ends with an MTP style connector carries the optical signals between unit 1 and unit 2.

FIG. 3 shows the mechanical design of the adaptor for the M28876/NGCON family of military fiber optic connectors. The adaptor plate has one or more MTP assembly connectors on it. In addition, a hole for a colored plug 305 is available so that the adaptor can be color coded to match with color coding on a fiber optic cable. This can be useful if multiple fiber optic cables are needed along with multiple adaptors so that the operator can use the colors to identify which cable should be plugged into which adaptor. Without altering the concept of the design, other methods of matching cables with the adaptors can include coloring or marking of the adaptor plates, coloring or marking of the MTP connector itself. In the event that keyed connections are desired, a keyed MTP style connector can also be used. Notice that the adaptors can be mounted on the front or rear side of a panel. The MTP connectors and color tabs are within the body size of the corresponding M28876 connector. The number of fibers that the adaptor can accommodate is determined by the MTP connectors mounted on it. At present, 12-fiber, 24-fiber, and 72-fiber MTP connectors are available, but other densities are possible as the technology for MTP style connectors advances.

In the embodiment shown in FIG. 3, the present invention provides for an M28876/NGCON/D38999 to MTP adaptor comprising an M28876/NGCON/D38999 to MTP adaptor plate 302 that comprises: an opening (not shown) to receive an MTP fiber ribbon connector, with the MTP fiber connector connected to an MTP to ST fiber fan out cable, and an MTP connector 304 aligned with the opening, wherein the MTP connector 304 is configured to connect an MTP cable with said MTP fiber ribbon connector, wherein the M28876/NGCON/D38999 to MTP adaptor plate 302 has a substantially similar footprint to a standard M28876/NGCON/D38999 connector.

FIG. 4 is a front view of the 8-fiber M28876 connector and the MTP adaptor. The mechanical footprint of the adaptor is compatible with the M28876 so that it fits into the same physical space as the M28876.

Figure 5B:
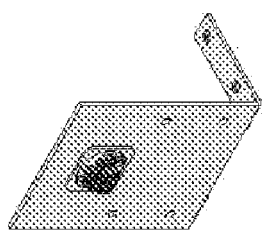
FIGS. 5a-b show a non-limiting example of the adaptor design to replace a jam nut mounted M28876.
Figure 5A:
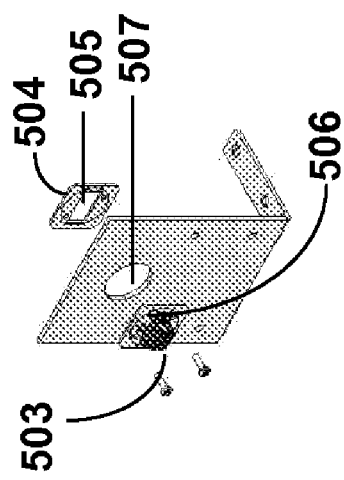

FIGS. 5a-b show the adaptor design to replace a jam nut mounted M28876. A jam nut mounted M28876 has a screw thread that protrudes through the panel hole and a bolt that screws in from the front of the panel to hold the connector. The adaptor design fits in the same footprint and consists of a front panel component and a rear component as show in FIG. 5a. The front panel component is shown with the MTP connector on it and is attached to the rear component by screws. The rear component has threaded holes that accept the mounting screws. When assembled, the front panel plate is sandwiched between the adaptor's front panel component and rear panel component as shown in FIG. 5b. Although shown as two rectangular pieces that screw together, the design could also be composed of a screw threaded component that protrudes through the panel, has one or more MTP type connectors mounted within its area, and attaches to the panel via a nut.

The present invention, as shown in FIG. 5a, provides for an M28876/NGCON/D38999 to MTP adaptor comprising: (a) an M28876/NGCON/D38999 to MTP adaptor plate; (b) a rear panel component 504 having a first opening 505 to pass an MTP fiber ribbon connector, with the MTP fiber connector being connected to an MTP to ST fiber fan out cable; and (c) a front panel component 506 having an MTP connector 503, the MTP connector 503 being configured to connect an MTP cable with the MTP fiber ribbon connector, wherein the M28876/NGCON/D38999 to MTP adaptor plate is sandwiched between the rear panel component 504 and the front panel component 506 and having at least a second opening 507 aligned with the first opening 505 in the rear panel to allow passage of the MTP fiber ribbon connector. The M28876/NGCON/D38999 to MTP adaptor plate has a footprint that is substantially similar to a standard M28876/NGCON/D38999 connector Although FIGS. 5a-b illustrate an example where the MTP connector 503 is on the front panel component 506, the present invention also envisions a scenario where the MTP connector is on the rear panel component 504. In this scenario, the present invention provides for an M28876/NGCON/D38999 to MTP adaptor comprising: (a) an M28876/NGCON/D38999 to MTP adaptor plate; (b) a rear panel component having an MTP connector, with the MTP connector being configured to connect an MTP cable with an MTP fiber ribbon connector, and the MTP fiber connector being connected to an MTP to ST fiber fan out cable; and (c) a front panel component having a first opening to receive the MTP connector, wherein the M28876/NGCON/D38999 to MTP adaptor plate is sandwiched between the front panel component and the rear panel component and has at least a second opening aligned with the first opening in the front panel to allow passage of said MTP connector. The M28876/NGCON/D38999 to MTP adaptor plate has a footprint that is substantially similar to a standard M28876/NGCON/D38999 connector.

Figure 6:
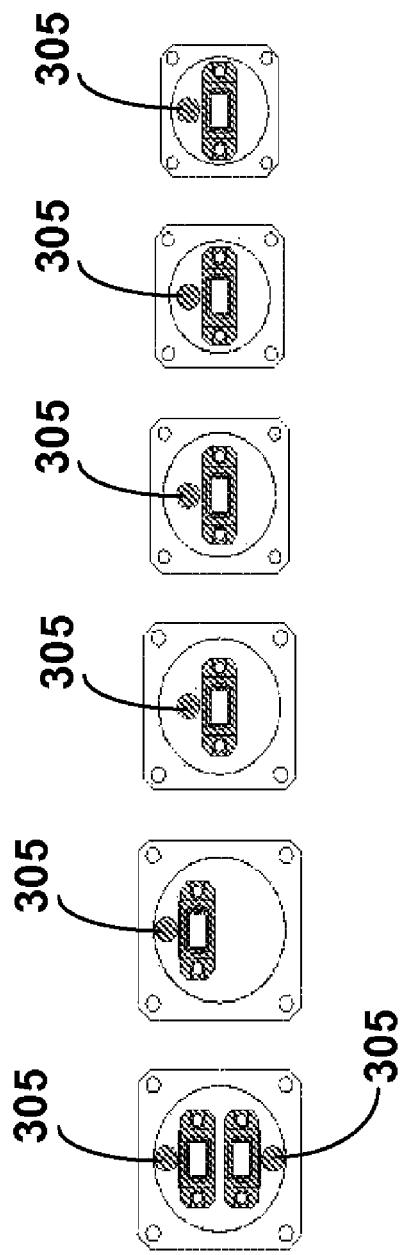
FIG. 6 shows a non-limiting example of the design for a family of D38999 to MTP adaptors that fit the footprint of the D38999 family of fiber connectors.
Figure 7:
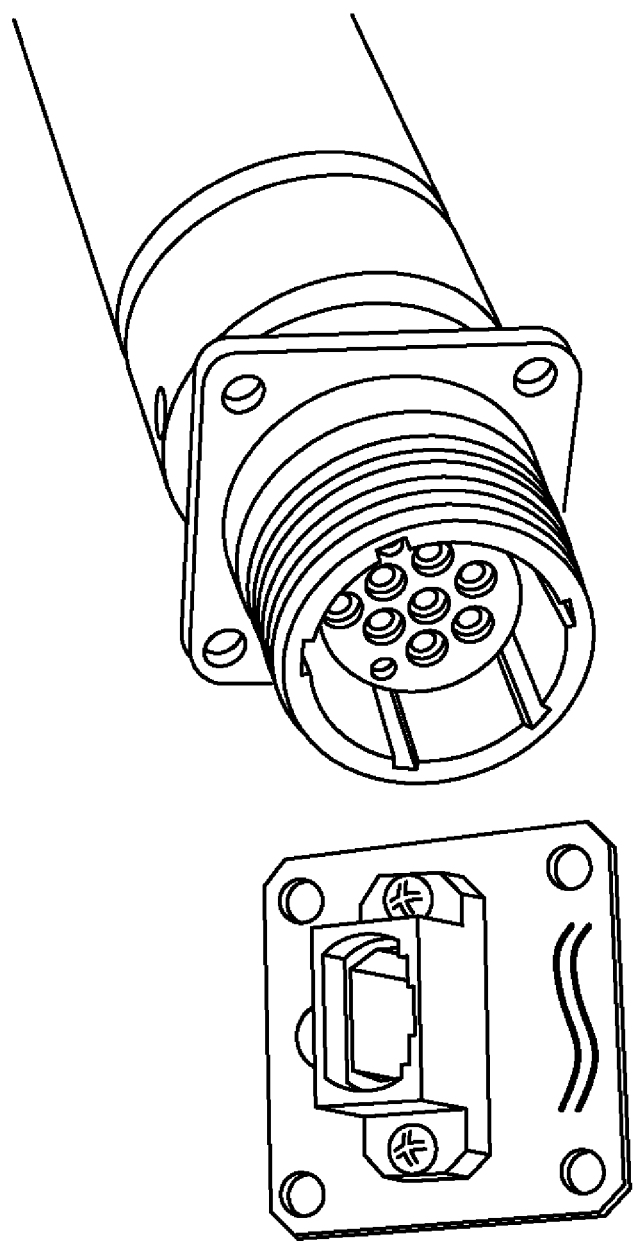
FIG. 7 shows a non-limiting example of the MTP adaptor fixture next to an 8-fiber M28876 connector.
Figure 8:
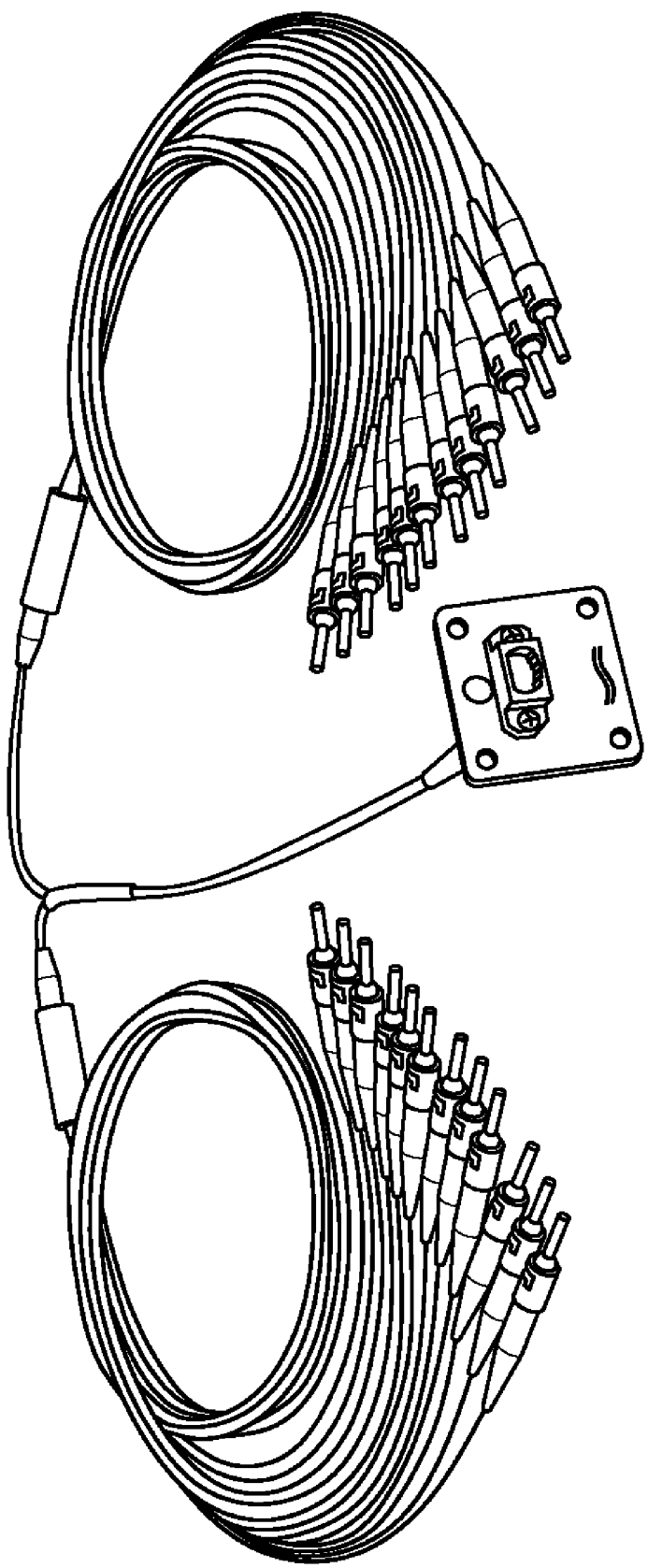
FIG. 8 illustrates a non-limiting example of a 24-fiber to MTP fan out connected to an M28876 to MTP adaptor.

FIG. 6 shows a non-limiting example of the design for a family of D38999 to MTP adaptors that fit the footprint of the D38999 family of fiber connectors. FIG. 7 shows a non-limiting example of the MTP adaptor fixture next to an 8-fiber M28876 connector. FIG. 8 illustrates a non-limiting example of a 24-fiber to MTP fan out connected to an M28876 to MTP adaptor.

Figure 9:
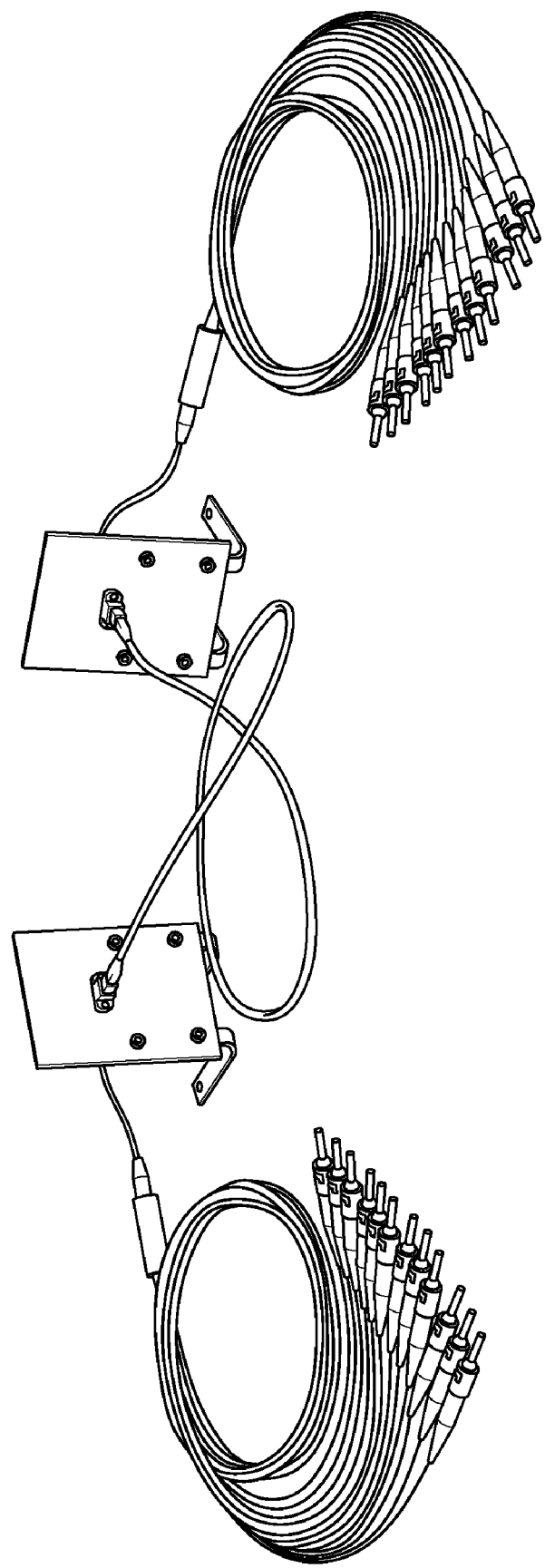
FIG. 9 illustrates a non-limiting example of a 24-fiber conversion kit that contains two ST to MTP fan out cables, two M28876 to MTP adaptors that are shown mounted to the panels, and an MTP to MTP cable that connects the two panels.

FIG. 9 illustrates a non-limiting example of a 24-fiber conversion kit that contains two ST to MTP fan out cables, two M28876 to MTP adaptors that are shown mounted to the panels, and an MTP to MTP cable that connects the two panels. In this embodiment, the present invention provides for an M28876/NGCON/D38999 to MTP adaptor kit comprising: (a) a pair of ST to MTP fan out cables; (b) a pair of M28876/NGCON/D38999 to MTP adaptors, and (c) an MTP to MTP cable, wherein each M28876/NGCON/D38999 to MTP adaptor comprises any of the following:

(a) an M28876/NGCON/D38999 to MTP adaptor plate; a rear panel component having a first opening to pass an MTP fiber ribbon connector, with the MTP fiber connector being connected to an MTP to ST fiber fan out cable; and a front panel component having an MTP connector, with the MTP connector being configured to connect an MTP cable with the MTP fiber ribbon connector; and the M28876/NGCON/D38999 to MTP adaptor plate being sandwiched between the rear panel component and the front panel component and having at least a second opening aligned with the first opening in the rear panel to allow passage of the MTP fiber ribbon connector;

(b) an M28876/NGCON/D38999 to MTP adaptor plate; a rear panel component having an MTP connector, with the MTP connector being configured to connect an MTP cable with an MTP fiber ribbon connector, and the MTP fiber connector being connected to an MTP to ST fiber fan out cable; and a front panel component having a first opening to receive the MTP connector; and the M28876/NGCON/D38999 to MTP adaptor plate being sandwiched between the front panel component and the rear panel component and having at least a second opening aligned with the first opening in the front panel to allow passage of the MTP connector; or (c) an M28876/NGCON/D38999 to MTP adaptor plate comprising: an opening to receive an MTP fiber ribbon connector, with the MTP fiber connector connected to an MTP to ST fiber fan out cable, and an MTP connector aligned with the opening, with the MTP connector being configured to connect an MTP cable with the MTP fiber ribbon connector;

wherein each of the above-mentioned M28876/NGCON/D38999 to MTP adaptor plates in (a), (b), and (c) has a footprint that is substantially similar to a standard M28876/NGCON/D38999 connector.

CONCLUSION

A system has been shown in the above embodiments for the effective implementation of an M28876/NGCON/D38999 to MTP adaptor and a kit containing the same. While various preferred embodiments have been shown and described, it will be understood that there is no intent to limit the invention by such disclosure, but rather, it is intended to cover all modifications falling within the spirit and scope of the invention, as defined in the appended claims. For example, the present invention should not be limited by the specific coloring or marking schemes, the specific combination of adaptors used in the present invention's kit, the number of fibers that an adaptor can accommodate (i.e., 12-fiber, 24-fiber, 72-fiber, etc.).

The invention claimed is:

1. An M28876/NGCON/D38999 to MTP adaptor comprising either:
   (a) an M28876/NGCON/D38999 to MTP adaptor plate; a rear panel component having a first opening to pass an MTP fiber ribbon connector, said MTP fiber connector connected to an MTP to ST fiber fan out cable; and a front panel component having an MTP connector, said MTP connector configured to connect an MTP cable with said MTP fiber ribbon connector; said M28876/NGCON/D38999 to MTP adaptor plate sandwiched between said rear panel component and said front panel component and having at least a second opening aligned with said first opening in said rear panel to allow passage of said MTP fiber ribbon connector; or
   (b) an M28876/NGCON/D38999 to MTP adaptor plate; a rear panel component having an MTP connector, said MTP connector configured to connect an MTP cable with an MTP fiber ribbon connector, said MTP fiber connector connected to an MTP to ST fiber fan out cable; and a front panel component having a first opening to receive said MTP connector; said M28876/NGCON/D38999 to MTP adaptor plate sandwiched between said front panel component and said rear panel component and having at least a second opening aligned with said first opening in said front panel to allow passage of said MTP connector;
   said M28876/NGCON/D38999 to MTP adaptor plate in (a) or (b) having a substantially similar footprint to a standard M28876/NGCON/D38999 connector.

2. The M28876/NGCON/D38999 to MTP adaptor of claim 1, wherein said M28876/NGCON/D38999 to MTP adaptor plate further comprises an indicator, said indicator being color coded to match a color coding associated with a fiber fan out cable.

3. The M28876/NGCON/D38999 to MTP adaptor of claim 2, wherein said indicator is a color plug indicator.

4. The M28876/NGCON/D38999 to MTP adaptor of claim 2, wherein said indicator is a colored panel indicator.

5. The M28876/NGCON/D38999 to MTP adaptor of claim 2, wherein said indicator comprises colored MTP connectors.

6. The M28876/NGCON/D38999 to MTP adaptor of claim 2, wherein said indicator comprises keyed MTP or MPO connectors.

7. The M28876/NGCON/D38999 to MTP adaptor of claim 2, wherein said MTP connector in (a) or (b) is both color coded and keyed.

* * * * *